(12) United States Patent
Kim et al.

(10) Patent No.: US 10,742,463 B2
(45) Date of Patent: Aug. 11, 2020

(54) METHOD AND TRANSMISSION APPARATUS FOR MULTIPLE ACCESS IN WIRELESS COMMUNICATION SYSTEM

(71) Applicant: INDUSTRY-ACADEMIC COOPERATION FOUNDATION, YONSEI UNIVERSITY, Seoul (KR)

(72) Inventors: Kwang-Soon Kim, Seoul (KR); Jong Hyun Kim, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 60 days.

(21) Appl. No.: 16/070,228

(22) PCT Filed: Jan. 19, 2017

(86) PCT No.: PCT/KR2017/000638
§ 371 (c)(1),
(2) Date: Sep. 13, 2018

(87) PCT Pub. No.: WO2017/126897
PCT Pub. Date: Jul. 27, 2017

(65) Prior Publication Data
US 2019/0052495 A1  Feb. 14, 2019

(30) Foreign Application Priority Data
Jan. 19, 2016 (KR) .................. 10-2016-0006325

(51) Int. Cl.
*H04L 27/26* (2006.01)
*H04L 5/00* (2006.01)
(Continued)

(52) U.S. Cl.
CPC .......... *H04L 27/2601* (2013.01); *H04B 7/04* (2013.01); *H04B 7/0617* (2013.01);
(Continued)

(58) Field of Classification Search
CPC .......... H04B 7/04; H04B 7/06; H04B 7/0617; H04B 7/068; H04B 7/0697; H04B 7/0848;
(Continued)

(56) References Cited

U.S. PATENT DOCUMENTS

2001/0055320 A1* 12/2001 Pierzga ............. H03M 13/6356
370/480
2004/0101046 A1* 5/2004 Yang ..................... H03M 13/15
375/240.08

(Continued)

OTHER PUBLICATIONS

Hamiti, Enver et al., "Spectrum Comparison between GFDM, OFDM and GFDM Behavior in a Noise and Fading Channel", International Journal of Electrical and Computer Engineering Systems, 2015, vol. 6, No. 2, pp. 39-43.
(Continued)

*Primary Examiner* — Young T Tse

(57) ABSTRACT

Disclosed are method and apparatus for enabling multiple access in a wireless communication system that can enable ultralow latency, ultra-reliable, and high throughput services. The disclosed multiple access method includes: allocating resources for a plurality of user terminals according to space and frequency; performing a discrete Fourier transform on a transmission symbol for each unit of the space, the transmission symbol composed of a plurality of sub-symbols and configured to be transmitted according to the allocated space and frequency resources; and applying a frequency filter and a spatial filter on the Fourier transformation result, and wherein the applying of the frequency filter and the spatial filter comprises: selecting a pulse shaping filter according to an arranged position of the allocated frequency resource for each unit of the space and applying the selected pulse shaping filter on a sample
(Continued)

representing a result of applying a Fourier transform on the sub-symbol to a frequency domain.

16 Claims, 8 Drawing Sheets

(51) Int. Cl.
  *H04W 72/04* (2009.01)
  *H04B 7/08* (2006.01)
  *H04L 27/36* (2006.01)
  *H04L 25/03* (2006.01)
  *H04B 7/04* (2017.01)
  *H04B 7/06* (2006.01)

(52) U.S. Cl.
  CPC ......... *H04B 7/0848* (2013.01); *H04L 5/0007* (2013.01); *H04L 5/0023* (2013.01); *H04L 5/0037* (2013.01); *H04L 25/03834* (2013.01); *H04L 27/264* (2013.01); *H04L 27/2636* (2013.01); *H04L 27/36* (2013.01); *H04W 72/044* (2013.01)

(58) Field of Classification Search
  CPC ..... H04L 5/0007; H04L 5/001; H04L 5/0023; H04L 5/003; H04L 5/0037; H04L 5/0042; H04L 25/03834; H04L 25/03891; H04L 27/2601; H04L 27/2626; H04L 27/2628; H04L 27/2636; H04L 27/2637; H04L 27/2639; H04L 27/264; H04L 27/36; H04W 72/044; H04W 72/0453; H04W 72/046
  USPC .......... 375/260–262, 265, 267; 370/208, 210
  See application file for complete search history.

(56) References Cited

U.S. PATENT DOCUMENTS

| 2004/0141548 | A1* | 7/2004 | Shattil | H04L 1/04 |
| | | | | 375/146 |
| 2006/0153283 | A1* | 7/2006 | Scharf | H04B 1/7107 |
| | | | | 375/148 |
| 2007/0211619 | A1* | 9/2007 | Jalloul | H04B 1/707 |
| | | | | 370/209 |
| 2015/0003542 | A1 | 1/2015 | Barbu et al. | |
| 2015/0172010 | A1 | 6/2015 | Gaspar | |
| 2015/0188654 | A1 | 7/2015 | Fettweis et al. | |
| 2017/0104620 | A1* | 4/2017 | Kim | H04L 27/34 |

OTHER PUBLICATIONS

Datta, Rohit, "Generalized Frequency Division Multiplexing in Cognitive Radio", PhD thesis, Fakultat Elektrotechnik und Informationstechnik, Technischen Universitat Dresden, Nov. 28, 2014.

Hyeon Su Kang et al., "Key Techniques and Performance Comparison of 5G New Waveform Technologies", The Journal of Korean Institute of Communications and Information Sciences '16-01 vol. 41 No. 01, http://dx.doi.org/10.7840/kics.2015.41.1.142.

* cited by examiner

Algorithm 1 Joint Optimization of USFDMA

Input: $\{b_i\}, \{BER_i\}, \{\mathcal{R}_i\}$

1: $\{\Psi\} \leftarrow$ Statistical filter according to $\{\mathcal{R}_i\}$
2: $\{b_{k,l}\} \leftarrow$ Uniform bit loading subject to $\{b_i\}$
3: $\{F\} \leftarrow$ ZF precoding subject to $\{b_{k,l}\}, \{BER_i\}$
4: for $i = 1 : N_{iteration}$ do
5:     procedure BIT LOADING($\{F\}, \{b_i\}$)
6:         for $i = 1 : N_{UE}$ do
7:             repeat
8:                 Calculate $P_{k,l}^+$ for $(k,l) \in \mathcal{R}_i$
9:                 Find $P_{k',l'}^+ = \min P_{k,l}^+$
10:                $b_{k',l'} \leftarrow b_{k',l'} + 1$
11:             until $\sum_{(k,l) \in \mathcal{R}_i} b_{k,l} = b_i$
12:         end for
13:     end procedure
14:     procedure SPATIO-FREQUENCY FILTER($\{b_{k,l}\}, \{BER_i\}$)
15:         for $v = 1 : MK$ do
16:             Solve the SOCP $$\mathcal{P}(\beta_h) = \begin{cases} \min_{\{F\},p} \; p \\ s.t. \quad \begin{bmatrix} \sqrt{1 + \frac{1}{\beta_h}} |H_v F_v|_{l,l} \\ F_v^H H_v^H e_l \\ \sigma_l \end{bmatrix} \succ_K 0 \\ \qquad \begin{bmatrix} p \\ vec(F_v) \end{bmatrix} \succ_K 0 \end{cases}$$

17:         end for
18:     end procedure
19: end for
20: $P = \mathbb{E}_v [F_v^H F_v]$ Output: $\{b_{k,l}\}, \{F\}, P$

FIG. 12

METHOD AND TRANSMISSION APPARATUS FOR MULTIPLE ACCESS IN WIRELESS COMMUNICATION SYSTEM

CROSS-REFERENCE TO RELATED APPLICATIONS

This application is a National Phase Application of PCT International Application No. PCT/KR2017/000638, which was filed on Jan. 19, 2017, and which claims priority from Korean Patent Application No. 10-2016-0006325 filed with the Korean Intellectual Property Office on Jan. 19, 2016, and Korean Patent Application No. 10-2017-0008734 filed with the Korean Intellectual Property Office on Jan. 18, 2017. The disclosures of the above patent applications are incorporated herein by reference in their entirety.

BACKGROUND

1. Technical Field

The present invention relates to a method and a transmission apparatus for enabling multiple access in a wireless communication system, more particularly to a method and a transmission apparatus for enabling multiple access in a wireless communication system that can enable ultralow latency, ultra-reliable, and high throughput services.

2. Description of the Related Art

As research institutions conduct various studies on 5G (5th generation) mobile communications, details are emerging regarding services that are expected to appear in the future, as well as the requirements needed for supporting such services. The ultralow latency, ultra-reliable, high throughput service, which is a new service category for 5G mobile communications, requires a wireless section latency of no more than 1 ms, a reliability of 99.999%, and data throughput of up to 100 Mbps.

To achieve the service conditions above, the following requirements have to be met. Each user needs a waveform configuration matching a different set of mobility and channel environment conditions, and such different types of waveforms have to coexist in an efficient manner. If multiple antennas are utilized at the transmitting and receiving ends, it would be possible to configure waveforms for the three dimensions of time, frequency, and space, and in this case, the required level of reliability has to be provided by decreasing interference between waveforms and increasing diversity. Non-orthogonal multiple access can be used for resources allocated to time, frequency, and space, and the non-orthogonality can be changed according to time or according to the channel environment.

A commercial mobile communication system currently being used, IMT-Advanced, uses the OFDM (orthogonal frequency division multiplexing) waveform. The OFDM waveform uses a cyclic prefix (CP) to resolve multipath fading and offers the advantage that waveform modulation can be implemented with a low degree of complexity via the fast Fourier transform. However, with the OFDM waveform, the magnitude of out-of-band emissions is great in non-orthogonal circumstances, so that when the OFDM waveform is used together with waveforms having different parameters, there may be inefficiency incurred by interference resulting therefrom, and as such, there is the drawback that the OFDM waveform must be used as a single waveform.

To compensate for this drawback of the OFDM waveform, research institutions, communication providers, and manufacturers associated with 5th generation mobile communications have presented the multi-carrier waveform using a filter. The METIS-II project, carried out by a partnership for 5G technology development known as 5GPPP, is considering the FBMC (filter-bank multi-carrier modulation) waveform for a wireless interface, while research is under way for other projects such as GFDM (generalized frequency division multiplexing), UFMC (universal filtered multi-carrier), f-OFDM (filtered-OFDM), etc.

The multi-carrier waveform using a filter described above is resilient against asynchronicity compared to the OFDM waveform and allows waveforms to coexist in an efficient manner without interference even when the waveform parameters are different.

SUMMARY OF THE INVENTION

An aspect of the invention is to provide a method and a transmission apparatus for enabling multiple access in a wireless communication system that can provide ultralow latency, ultra-reliable, and high throughput services.

To achieve the objective above, an embodiment of the present invention provides a method for enabling multiple access in a wireless communication system, the method comprising: allocating resources for multiple user terminals according to space and frequency; performing a discrete Fourier transform on a transmission symbol, which is composed of a multiple number of sub-symbols and is configured to be transmitted according to the allocated space and frequency resources, for each unit of the space; and applying a frequency filter and a spatial filter on the Fourier transformation result, where applying the frequency filter and the spatial filter includes: selecting a pulse shaping filter according to an arranged position of the allocated frequency resource and applying the selected pulse shaping filter on a sample representing a result of applying a Fourier transform on the sub-symbol to a frequency domain, for each unit of the space.

Also, to achieve the objective above, another embodiment of the present invention provides a method for enabling multiple access in a wireless communication system, the method comprising: allocating resources for multiple user terminals according to space and frequency; performing a discrete Fourier transform on a transmission symbol, which is composed of a multiple number of sub-symbols and is configured to be transmitted according to the allocated space and frequency resources, for each unit of the space; and applying a frequency filter and a spatial filter on a sample representing a result of applying a Fourier transform on the sub-symbol to a frequency domain, where the frequency filter includes a frequency-domain equalizer filter and a pulse shaping filter.

Also, to achieve the objective above, yet another embodiment of the present invention provides a transmission apparatus for enabling multiple access in a wireless communication system, the transmission apparatus comprising: a resource allocation part configured to allocate resources for a multiple number of user terminals according to space and frequency; a Fourier transform part configured to perform a discrete Fourier transform on a transmission symbol for each unit of the space, where the transmission symbol is composed of a plurality of sub-symbols and is configured to be transmitted according to the allocated space and frequency resources; and a filtering part configured to select a pulse shaping filter according to an arranged position of the allocated frequency resource and to apply the selected pulse shaping filter on a sample representing a result of applying a Fourier transform on the sub-symbol to a frequency domain, for each unit of the space.

According to the present invention, it is possible to reduce interference between subcarriers by selecting a pulse shaping filter according to the arrangement positions of resources allocated for each frequency, instead of using a fixed pulse shaping filter.

Also, the present invention can provide a high beam-forming resolution and excellent out-of-bound channel performance by applying frequency filters and spatial filters for each sample as a unit.

BRIEF DESCRIPTION OF THE DRAWINGS

FIG. 12 is a diagram illustrating pseudo-code for describing a method of enabling multiple access according to another embodiment of the present invention.

DETAILED DESCRIPTION OF THE INVENTION

Figure 1:
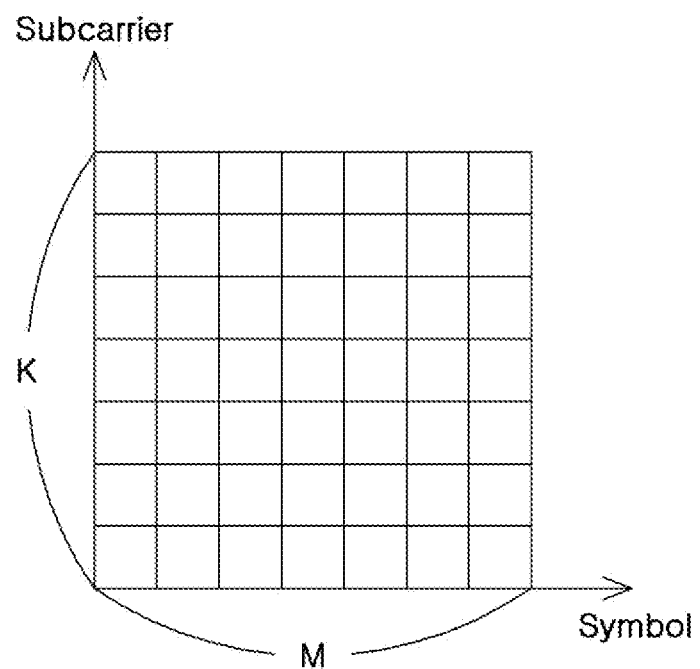
FIG. 1 and FIG. 2 are diagrams for describing GFDM.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, similar reference numerals are used for similar elements.

The present invention proposes a novel method of enabling multiple access in a wireless communication system, and in the present specification, the method of enabling multiple access based on the present invention will be referred to as USFDMA (universal spatio-frequency division multiple access).

The method of enabling multiple access based on the present invention provides a high beam-forming resolution and excellent out-of-bound channel performance under the service requirements for ultralow latency, ultra-reliability, and high throughput and allows high frequency efficiency compared to GFDM and OFDM.

In the following, a brief overview of GFDM will first be provided, after which the embodiments of the present invention will be described in detail with reference to the accompanying drawings.

Figure 2:
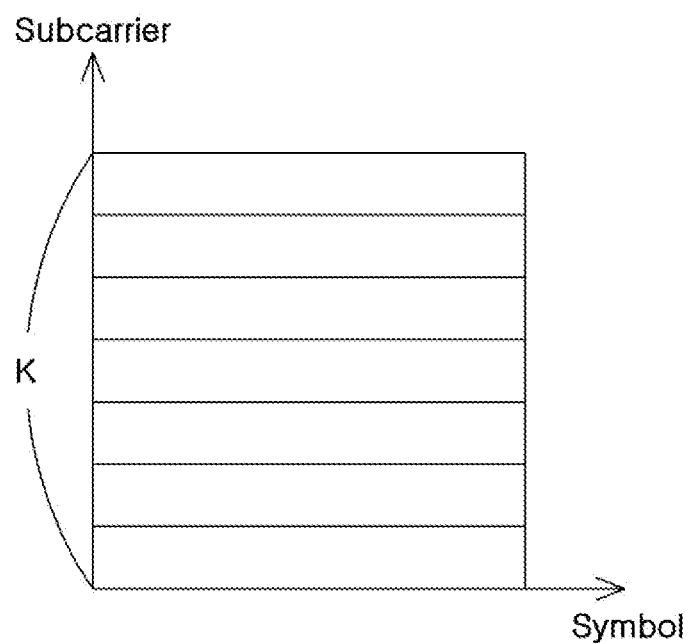

FIG. 1 and FIG. 2 are diagrams for describing GFDM.

When transmitting N=KM sets of data, GFDM transmits the data in the form of a data block composed of K subcarriers and M sub-symbols, as illustrated in FIG. 1. Compared with the data block of OFDM illustrated in FIG. 2, the data block of GFDM illustrated in FIG. 1 has one transmission symbol composed of multiple sub-symbols, and in GFDM, one subcarrier transmits multiple sub-symbols.

In GFDM, all of the data that is to be transmitted is modulated with a GFDM transmission matrix A, after which the data is transmitted with a CP (cyclic prefix) added as in OFDM, in order to minimize the effect of the channel's delay spread and remove interference between the GFDM blocks.

When the data to be transmitted is constant at N=KM, an increase in the number of sub-symbols causes an increase in the interval between subcarriers. Here, if the channel has a frequency selective property, the performance of the GFDM may be decreased, as self-interference cannot be removed. However, if the FFT size of GFDM is increased M times over the previously used FFT size, then M samples can be included in-between the subcarrier intervals that are the same as before, so that the frequency resolution may be increased, and the performance may not be greatly decreased even in a frequency selective channel.

GFDM uses a fixed pulse shaping filter in the frequency domain to perform filtering on samples, which are obtained as results of a frequency transform on sub-symbols. The frequency-domain equalizer filtering and spatial filtering are performed for each transmission symbol as a unit.

In GFDM, the non-orthogonal waveform generated by the pulse shaping filtering may cause interference of the subcarriers and increase the BER.

Thus, the present invention proposes a multiple access method that can reduce interference between subcarriers to satisfy the service requirements for ultralow latency, ultra-reliability, and high throughput.

A method of enabling multiple access based on the present invention can reduce interference between subcarriers by selecting a pulse shaping filter according to the arrangement positions of resources allocated for each frequency instead of using a fixed pulse shaping filter.

Also, a method of enabling multiple access based on the present invention can provide a high beam-forming resolution and excellent out-of-bound channel performance by applying a frequency filter and a spatial filter for each sample as the unit.

A method of enabling multiple access based on the present invention can be performed at a transmission apparatus for enabling multiple access, where the transmission apparatus can be a base station.

Figure 3:
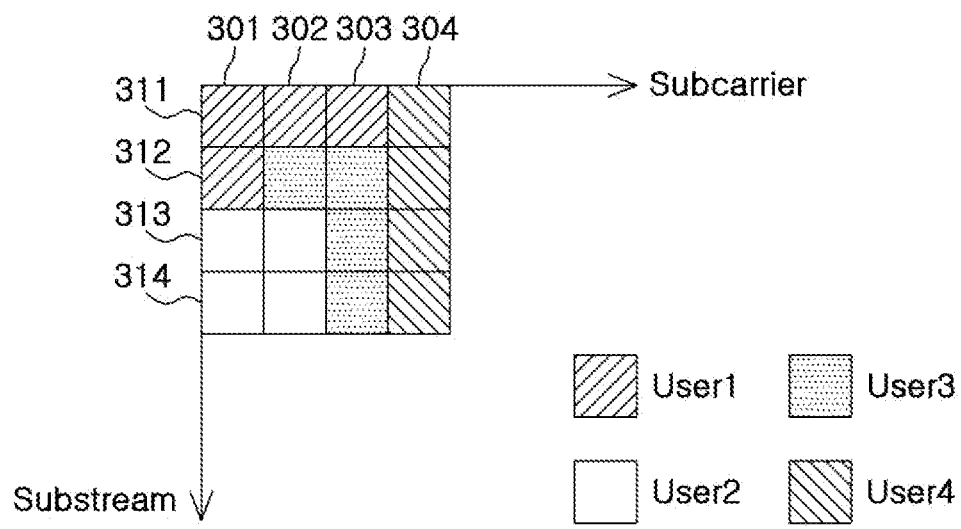
FIG. 3 is a diagram illustrating a map for allocating resource blocks according to an embodiment of the present invention.
Figure 4:
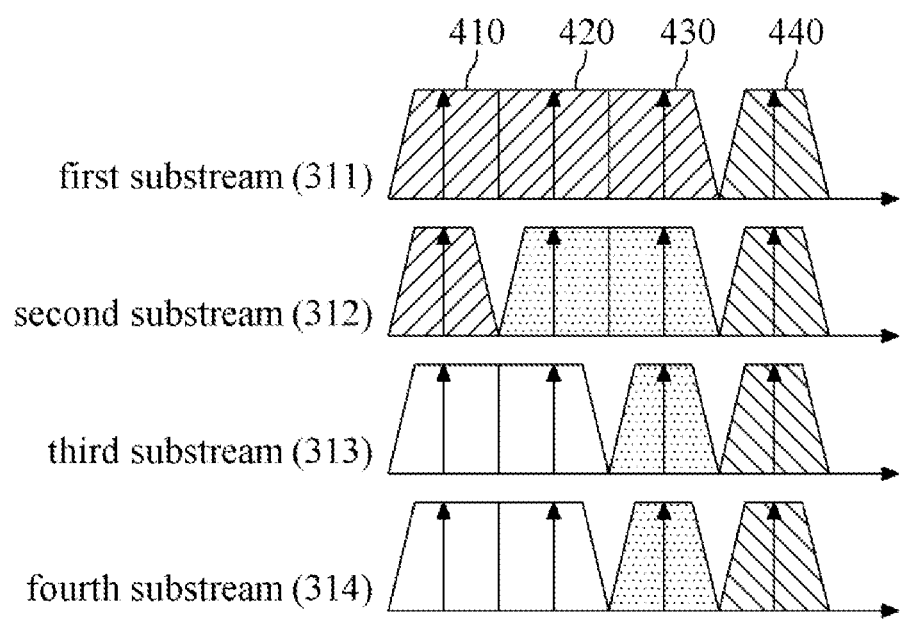
FIG. 4 and FIG. 5 are diagrams illustrating subcarriers filtered according to the resource block allocation map of FIG. 3.
Figure 5:
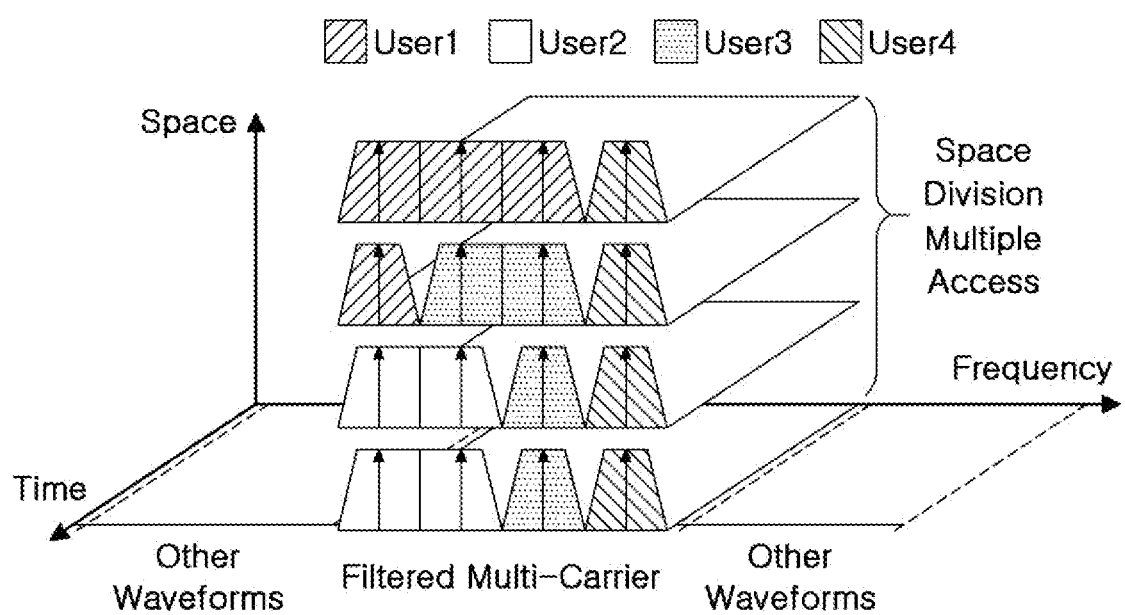
Figure 6:
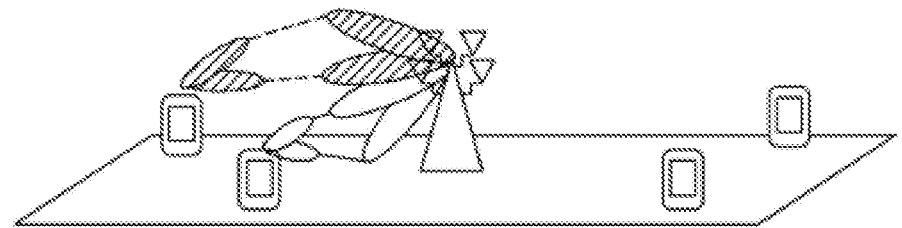
FIG. 6 is a diagram for describing spatial multiple access according to the resource block allocation map of FIG. 3.
Figure 6:
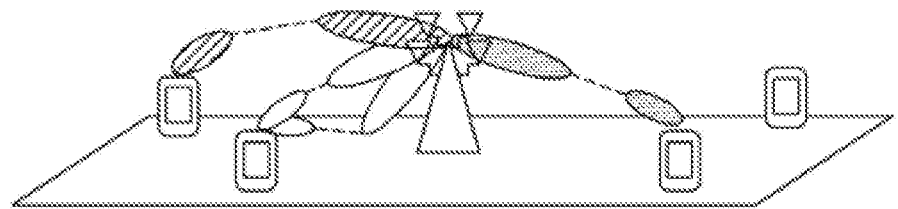
Figure 6:
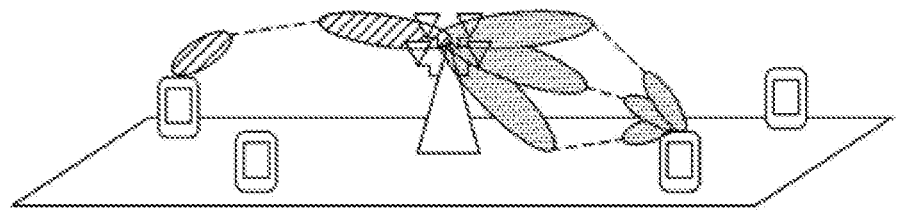
Figure 6:
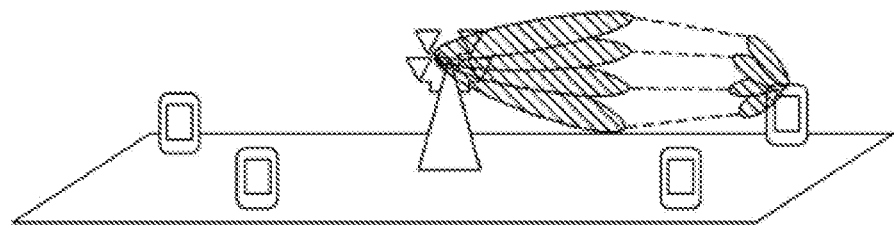

FIG. 3 is a diagram illustrating a map for allocating resource blocks according to an embodiment of the present invention, and FIG. 4 and FIG. 5 are diagrams illustrating subcarriers filtered according to the resource block allocation map of FIG. 3. FIG. 6 is a diagram for describing spatial multiple access according to the resource block allocation map of FIG. 3.

While FIG. 3 is described using an example in which four subcarriers and four substreams are allocated to four user terminals, the allocation of resources can take various forms in different embodiments.

A base station based on the present invention may allocate space and frequency resources for each user terminal in consideration of resource circumstances, channel statuses, service requirements, etc., as illustrated in FIG. 3. Subcarriers may correspond to frequency resources, while substreams may correspond to space resources.

For example, data for a first user terminal (User1) may be transmitted via the first to third subcarriers 301, 302, 303 and at the same time via a first and a second substream 311, 312. Also, data for a fourth user terminal (User4) may be transmitted via a fourth subcarrier 304 and at the same time via a first to a fourth substream 311, 312, 313, 314.

The base station may transmit transmission symbols to the user terminals according to the allocated resources, where a transmission symbol is composed of multiple sub-symbols. The base station may perform a discrete Fourier transform for each unit of space, i.e. for each substream, and according to the Fourier transform, the sub-symbols may be expressed as different frequency components in the frequency domain.

The base station may, for each space unit, select a pulse shaping filter according to the arrangement positions of the allocated frequency resources and apply the selected pulse shaping filter to the samples, which are the results of a Fourier transform on the sub-symbols to the frequency domain. The discrete Fourier transform may be an M-point FFT (fast Fourier transform), where the result of the Fourier transform has a different frequency component represented for each sub-symbol, and where M corresponds to the number of sub-symbols.

Referring to FIG. 4, which illustrates subcarriers filtered for each substream, it can be seen that four pulse shaping filters have been applied. The filtered subcarriers of FIG. 4 are expressed for a group of samples for which filtering is performed simultaneously, and since multiple sub-symbols are transmitted via one subcarrier, the pulse shaping filtering may be performed for each of a multiple number of sample groups.

That is, as shown in FIG. 5, which expresses the filtered subcarriers of FIG. 4 in the time-space-frequency domain, each sub-symbol in the time-space-frequency domain corresponds to a symbol duration in the time domain, so that samples may be generated in the frequency domain according to each sub-symbol for all subcarriers, and the pulse shaping filtering may be performed according to each sample group.

The pulse shaping filter may be selected from among a SRRC (square-root raised cosine) filter 440, a left-squeezed SRRC filter 410, a right-squeezed SRRC filter 430, and a rectangular filter 420, where the pulse shaping filter can be selected according to whether the allocation indexes of frequency resources for the same user terminal are consecutive or not.

Referring to FIG. 4 and FIG. 5, the frequency response of a SRRC filter 440 may have a trapezoidal shape, and the frequency response of a rectangular filter 420 may have a rectangular shape. Also, as compared with the SRRC filter 440, the frequency response of a left-squeezed SRRC filter 410 may have the right side formed in a rectangular shape, and the frequency response of a right-squeezed SRRC filter 430 may have the left side formed in a rectangular shape.

If the allocation indexes of frequency resources for the same user terminal are consecutive, the base station can perform pulse shaping filtering on the samples in the order of a left-squeezed SRRC filter and a right-squeezed SRRC filter, and if there are three or more consecutive allocation indexes, the base station can perform pulse shaping filtering on the samples with at least one rectangular filter arranged between the left-squeezed SRRC filter and the right-squeezed SRRC filter.

In FIG. 3, the allocation indexes can be assigned in the order of the first subcarrier to the fourth subcarrier. Referring to FIG. 3, since the frequency resources, i.e. subcarriers, for the first user terminal are allocated consecutively, the left-squeezed SRRC filter 410 and the right-squeezed SRRC filter 430 may be applied to the samples in said order, and since three subcarriers are allocated consecutively, a rectangular filter 420 may be arranged between the left-squeezed SRRC filter 410 and the right-squeezed SRRC filter 430. If there are four subcarriers allocated consecutively to the first user terminal, there can be two rectangular filters arranged between the left-squeezed SRRC filter and the right-squeezed SRRC filter.

As for the third user terminal, since two subcarriers are allocated consecutively, the left-squeezed SRRC filter 410 and the right-squeezed SRRC filter 430 may be applied, in said order, without a rectangular filter 420.

In cases where the allocation indexes of frequency resources for the same user terminal are not consecutive, the base station may perform pulse shaping filtering on the samples by using a SRRC filter. In FIG. 3, the subcarriers for the fourth user terminal are allocated one for each substream and are not consecutive, and therefore for the fourth user terminal, the SRRC filter 440 may be applied as in FIG. 4.

As described above, the signals filtered in the frequency domain may be transmitted to user terminals via different substreams, in a manner illustrated in FIG. 6. FIG. 6(a) to FIG. 6(b) illustrate first to fourth substreams transmitted via first to fourth subcarriers, respectively.

Symbols for a first and a second user terminal, to which the first subcarrier is allocated, may be transmitted via the first to fourth substreams to the first and second user terminals, as shown in FIG. 6(a). Referring to FIG. 3, the symbols for the first user terminal may be transmitted via the first and the second substream, which are formed by different beams, and the symbols for the second user terminal may be transmitted via the third and the fourth substream, which are formed by different beams.

Similarly, the symbols that are each allocated to a subcarrier may be transmitted to user terminals via the first to fourth sub streams, as illustrated in FIG. 6(b) to FIG. 6(d).

The base station may perform filter shaping filtering and may perform frequency-domain equalizer filtering and spatial filtering together. The frequency-domain equalizer filtering and the spatial filtering can also be performed for each sample as the unit, and the frequency-domain equalizer filter and the spatial filter can be determined according to the channel status of each user terminal.

Figure 7:
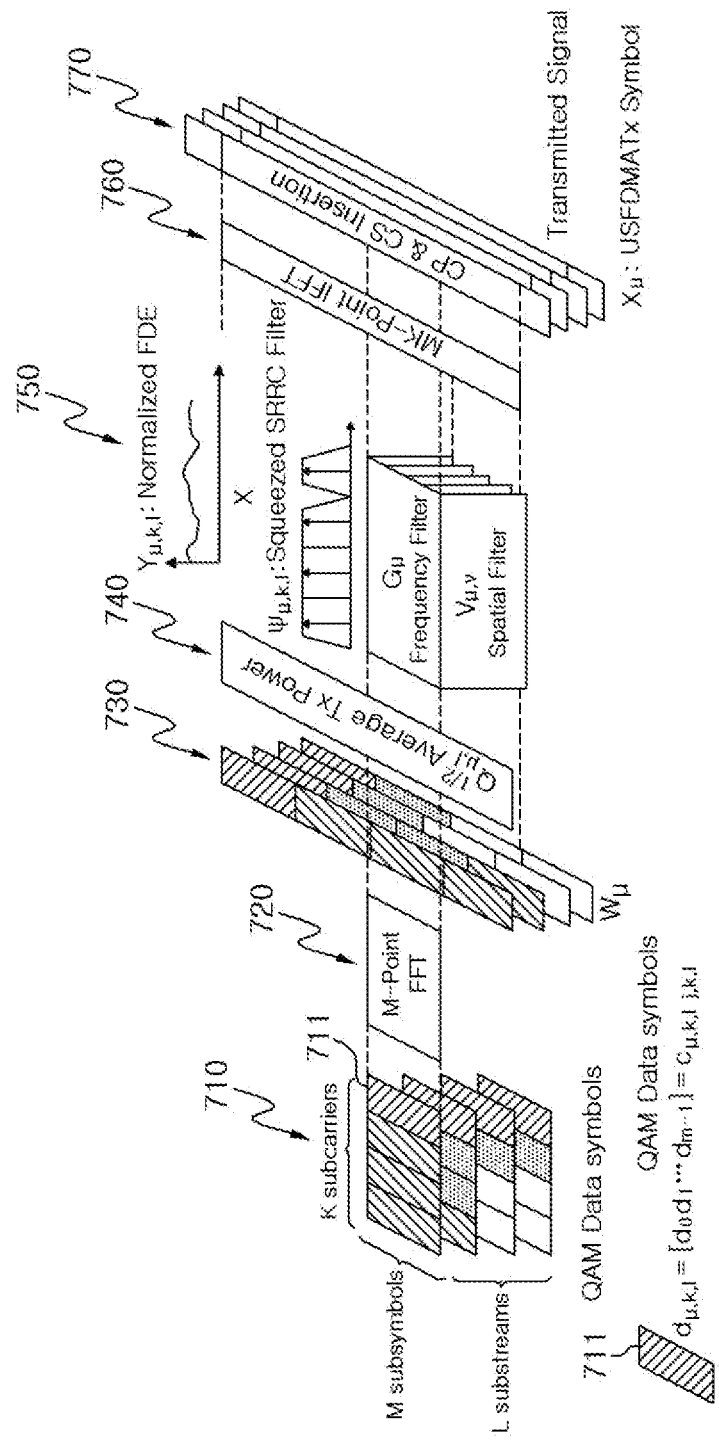
FIG. 7 is a diagram for describing a transmission system according to an embodiment of the present invention.
Figure 8:
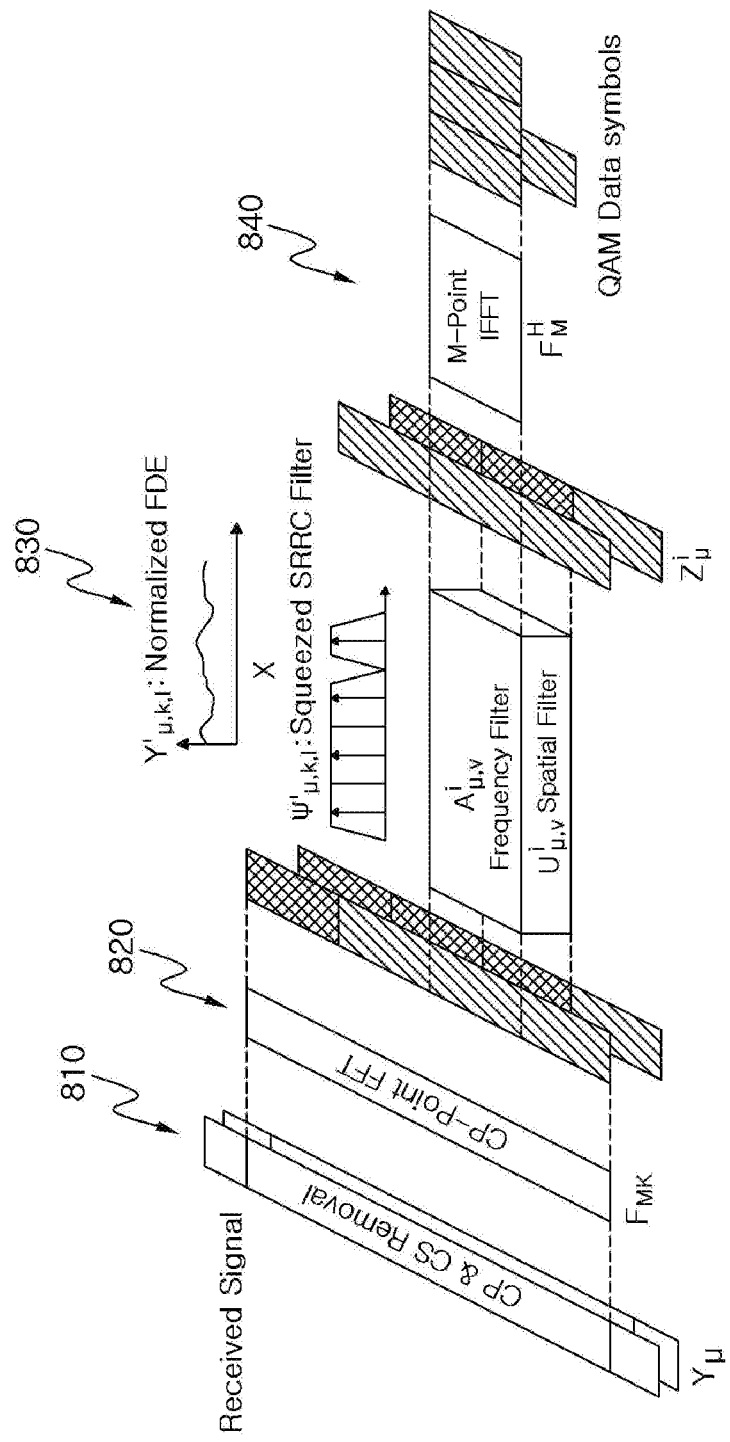
FIG. 8 is a diagram for describing a reception system according to an embodiment of the present invention.

FIG. 7 is a diagram for describing a transmission system according to an embodiment of the present invention, and FIG. 8 is a diagram for describing a reception system according to an embodiment of the present invention.

FIG. 7 illustrates a series of transmission processing procedures performed at the base station, where FIG. 7 is described using an example in which the resource blocks are allocated as in FIG. 3. FIG. 8 illustrates a series of reception processing procedures performed at a user terminal, where FIG. 8 is described using the reception system for the first user terminal as an example.

A base station based on the present invention may arrange data blocks according to the allocated resources (710) as in FIG. 3. That is, the data blocks composed of M sub-symbols may be arranged according to the subcarriers and substreams allocated to the user terminals. The data blocks may correspond to the transmission symbols described above.

The sub-symbols allocated to each block can be QAM data, for example, and can be expressed as vectors as in [Equation 1]. Alternatively, in different embodiments, different modulation schemes can be applied to the sub-symbols, and each sub-symbol can be data obtained with at least one modulation scheme.

$$d_{\mu,k,l} = [d_0 \ d_1 \ \ldots \ d_{M-1}]^T \qquad \text{[Equation 1]}$$

Here, μ represents the index of a data block, k represents the index of the subcarrier, and l represents the index of the substream. For example, for the data block 711, μ can be 4, k can be 4, and l can be 1.

The base station may perform an M-point FFT for each unit of space, i.e. for each substream (720). Then, the results of the Fourier transform may be arranged according to subcarrier index for a substream, and the results of the Fourier transform performed for each spatial unit may be arranged according to substream index (730).

As a result of the M-point FFT, frequency domain signals may be generated for each data block, where the frequency domain signals can be expressed by [Equation 2].

$$W_\mu^i = \sum_{(k,l) \in \mathcal{R}_i} e_{L_t,l} d_{\mu,k,l}^T \Phi_M E_{M,MK,k}, \ W_\mu^i \in \mathbb{C}^{L_t \times MK} \qquad \text{[Equation 2]}$$

Here, i represents the index for the user terminal, and $\Phi_M$ represents an M-point DFT matrix. $e_{L_t,l}$ represents the l-th column in an identity matrix of size $L_t \times L_t$, and $E_{M,MK,k} = e_{K,k} \otimes I_K$. $\otimes$ represents a Kronecker product operator.

The base station may multiply a power allocation parameter Q to the frequency domain signal for each sub stream (740), to compensate for the attenuation of the effective channel, and may perform filtering on the samples (750), where the samples are the results obtained after the sub-symbols undergo a Fourier transform to the frequency domain. The power allocation parameter Q will be described later in further detail with reference to FIG. 12.

More specifically, the base station may perform the filtering for each sample as a unit by using a frequency filter ($G_\mu = \Gamma_\mu \circ \Psi_\mu$) and a spatial filter ($V_{\mu,\nu}$), where the frequency filter may include a frequency-domain equalizer filter ($\Gamma_\mu$) and a pulse shaping filter ($\Psi_\mu$).

The base station can, for each unit of space, select a pulse shaping filter according to the arrangement position of the frequency resource allocated to the user terminal, i.e. according to the allocation index of the subcarrier, and can select one of the four filters described above. Using the selected filter, the base station may perform the pulse shaping filtering on the samples in units of sub streams.

Here, the base station can perform frequency-domain equalizer filtering and pulse shaping filtering together with the pulse shaping filtering in units of samples. The base station can determine the frequency-domain equalizer filter and the spatial filter according to the channel statuses of the user terminals and can determine the frequency-domain equalizer filter and the spatial filter in consideration of channel status for each duration of sub-symbol. In particular, the base station can determine the spatial filter in consideration additionally of the channel status for each substream, where the spatial filter is a filter for precoding and is a filter for beam forming.

Afterwards, the base station may perform an MK-point IFFT to transform the signals of a frequency domain to signals of a time domain (760) and may transmit the signals to the user terminals with CP's or CS's (cyclic suffixes) inserted according to channel status (770).

The signals in the time domain can be obtained by using [Equation 3].

$$\begin{aligned} X_\mu &= \sum_{i=1}^{N_{UE}} X_\mu^i \\ &= \left( \sum_{\nu=0}^{MK-1} V_{\mu,\nu} \circ g_{\mu,\nu} P_\mu^{1/2} w_{\mu,\nu} e_{MK,\nu}^T \right) \Phi_{MK}^H \\ &= [\ x_{\mu,0} \ \ x_{\mu,1} \ \ \ldots \ \ x_{\mu,MK-1} \ ] \end{aligned} \qquad \text{[Equation 3]}$$

Here, ∘ represents a Hadamard product operator, and $\Phi_{MK}^H$ represents an IDFT matrix. $N_{UE}$ is the number of user terminals, and $P_\mu^{1/2}$ represents the power allocation parameter.

That is, the filtering can be performed by multiplying a frequency filter vector and a spatial filter vector to all samples MK in the frequency domain.

As the IFFT and the insertion of a CP or a CS can be performed in the same manner as for GFDM, the details of these procedures are omitted here.

The signals thus transformed into the time domain may be transmitted to the user terminals, and a user terminal can recover the QAM data symbols from the received signals as in FIG. 8. The procedures for processing a received signal may proceed in an inverse order of the procedures for processing a transmission signal.

Referring to FIG. 8, which represents the procedures for processing received signals for the first user terminal, the first user terminal may first remove the CP or CS from the received signals $Y_\mu$ (810). After performing an MK-point FFT (820), a frequency filter ($A_{\mu,\nu}^i$) and a spatial filter ($U_{\mu,\nu}^i$) may be applied in the frequency domain to demodulate the frequency domain signals (830). Then, an M-point IFFT may be performed to recover the QAM data symbols in the time domain (840).

The frequency filter may include a pulse shaping filter ($\psi'_{\mu,k,l}$) and a frequency-domain equalizer filter ($Y'_{\mu,k,l}$) where the filtering procedure may be the same as the processing procedure for the transmission signals.

Figure 9:
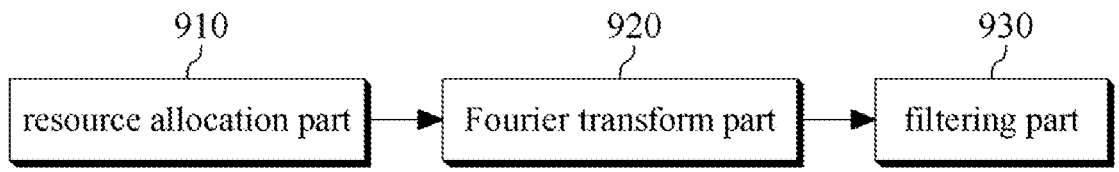
FIG. 9 is a diagram for describing a transmission apparatus for enabling multiple access according to an embodiment of the present invention.

FIG. 9 is a diagram for describing a transmission apparatus for enabling multiple access according to an embodiment of the present invention.

A transmission apparatus based on the present invention may include a resource allocation part 910, a Fourier transform part 920, and a filtering part 930.

The resource allocation part 910 can allocate resources for multiple user terminals according to space and frequency, for example as in FIG. 3.

The Fourier transform part 920 may perform a discrete Fourier transform on transmission symbols, which are composed of multiple sub-symbols and are transmitted according to the allocated space and frequency resources, in spatial units.

The filtering part 930 may, in units of space, i.e. in units of sub streams, select a pulse shaping filter according to the arrangement position of the allocated frequency resources and apply the selected pulse shaping filter to the samples, which are obtained as results of Fourier transforms on sub-symbols to the frequency domain.

The filtering part 930 can perform precoding for each sample, and in certain embodiments, can include a frequency filtering part and a spatial filtering part.

The frequency filtering part may perform filtering on the samples by using a pulse shaping filter and a frequency-domain equalizer filter. The filtering can be performed by multiplying each sample in the frequency domain with the frequency response of the pulse shaping filter and the frequency response of the frequency-domain equalizer filter. The spatial filtering part may also perform the filtering in units of samples.

The samples precoded by the filtering part 930 may be transformed into signals of a time domain and transmitted to the user terminals.

The pulse shaping filtering can be performed as described above with reference to FIGS. 3 to 7.

The present invention is characterized in that, in contrast to GFDM which performs frequency-domain equalizer filtering and spatial filtering in units of transmission symbols, a transmission apparatus based on the present invention performs the frequency-domain equalizer filtering and spatial filtering in units of samples. Detailed descriptions of frequency-domain equalizer filtering and spatial filtering are omitted here.

Figure 10:
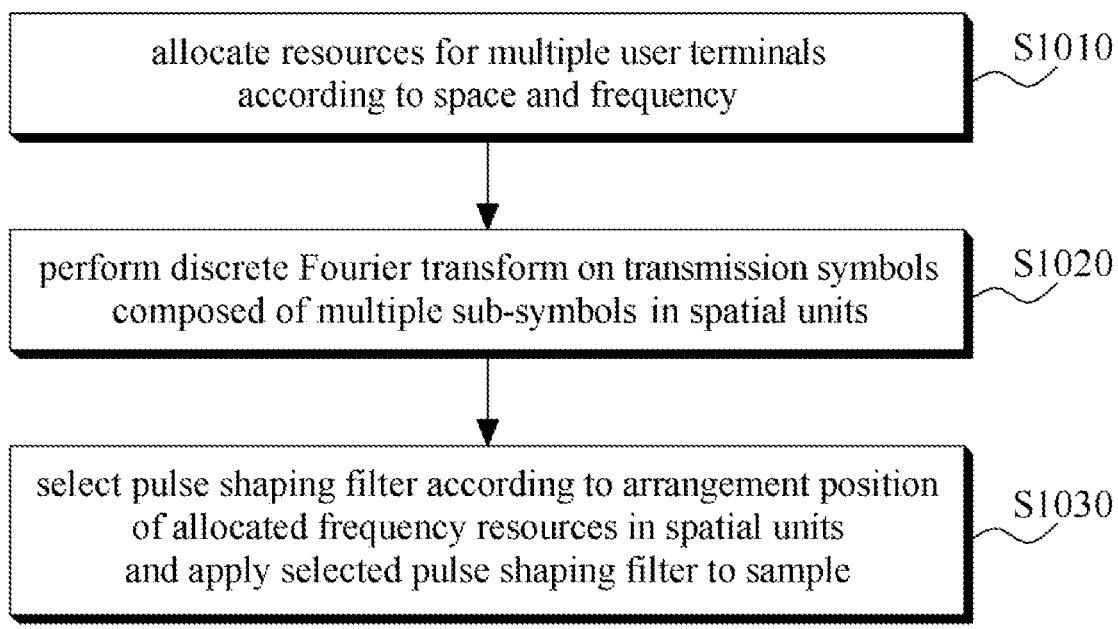
FIG. 10 is a diagram for describing a method of enabling multiple access according to an embodiment of the present invention.

FIG. 10 is a diagram for describing a method of enabling multiple access according to an embodiment of the present invention, where in FIG. 10, a method of enabling multiple access for the transmission apparatus described above is described as one embodiment.

A transmission apparatus based on the present invention may allocate resources for multiple user terminals according to space and frequency (S1010). Then, for transmission symbols, which are composed of multiple sub-symbols and are transmitted according to the allocated space and frequency resources, a discrete Fourier transform may be performed in spatial units (S1020). Here, the discrete Fourier transform may be M-point FFT, where M may correspond to the number of sub-symbols. The modulation scheme may be determined for each sub-symbol, where the sub-symbols can be, for example, QAM data symbols.

Afterwards, the transmission apparatus can apply a frequency filter and a spatial filter to the Fourier transform results, applying a frequency filter and a spatial filter to samples, which are the results of Fourier transforms of sub-symbols to the frequency domain. The frequency filter may include a pulse shaping filter and a frequency-domain equalizer filter.

More specifically, the transmission apparatus may, for each spatial unit, select a pulse shaping filter according to the arrangement positions of the allocated frequency resources and apply the selected pulse shaping filter to the samples, which are the resultant values of Fourier transforms of sub-symbols to the frequency domain (S1030). The transmission apparatus can select a pulse shaping filter from among a SRRC filter, left-squeezed SRRC filter, a right-squeezed SRRC filter, and a rectangular filter.

Also, the transmission apparatus can apply a frequency-domain equalizer filter and spatial filter appropriate for the channel status of the user terminal to the samples. Here, the modulation index and the spatial filter can be determined simultaneously such that the power for a transmission symbol is minimized.

A transmission apparatus based on the present invention can determine the frequency, spatial filter and modulation index such that the transmission power may be minimized, and this will be described later in further detail with reference to FIG. 12.

Figure 11:
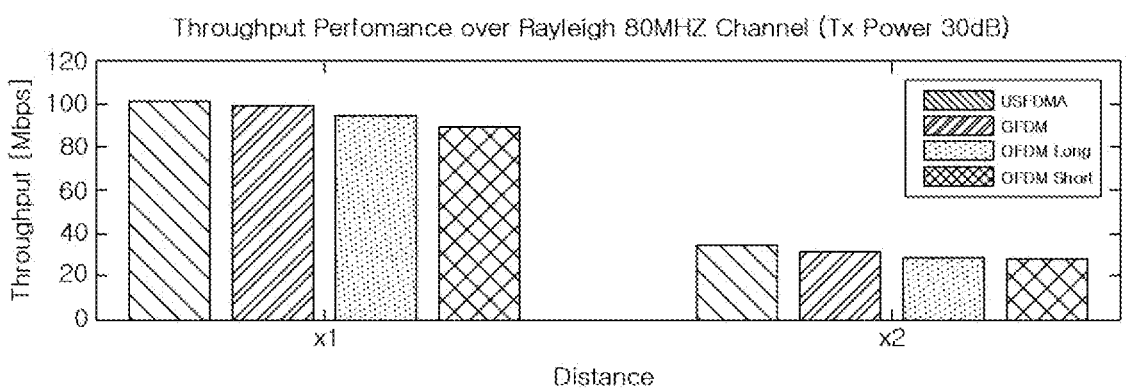
FIG. 11 is a diagram illustrating simulation results comparing the throughput obtained with the present invention and the throughput obtained with GFDM and OFDM.

FIG. 11 is a diagram illustrating simulation results comparing the throughput obtained with the present invention and the throughput obtained with GFDM and OFDM.

FIG. 11 illustrates simulation results where it is supposed that each user belongs to a Rayleigh fading channel environment having the same distance attenuation with respect to a single base station, users are divided in half into a high mobility group (500 km/s) and a low mobility group (0 km/s), and waveforms having different symbol lengths coexist according to mobility for the cases of USFDMA and GFDM to prevent Doppler fading. Since OFDM symbols of different lengths cannot coexist for low out-of-band (OOB) channel performance, the tests used long symbols (OFDM Long) and short symbols (OFDM Short). In the simulation, the central frequency is 5 Ghz, the bandwidth is 80 MHz, the subcarrier interval is 16.875 KHz, and long symbols used a 8192 FFT size whereas short symbols used a 1024 FFT size.

Since OFDM and GFDM use beam forming of the symbol level whereas USFDMA uses beam forming of the sample level, it can be seen that USFDMA provides a higher beam forming performance than does GFDM and provides a higher data throughput performance compared to OFDM under the given conditions due to the coexistence of waveforms matching mobility.

FIG. 12 is a diagram illustrating pseudo-code for describing a method of enabling multiple access according to another embodiment of the present invention.

FIG. 12 describes a method of minimizing the power required for transmitting transmission symbols while satisfying the data throughput condition and reliability condition required in mobile communication services. The present invention may determine the space-frequency filter ({V,G}) and the modulation index to use minimum transmission power while at the same time satisfying the data throughput condition and reliability condition.

The space-frequency filter may be a precoder, and according to the space-frequency filter determined by the present invention, the transmission symbol may be precoded and transmitted to the user terminal, with the bit numbers allocated to frequency-space resources determined by the modulation index determined based on the present invention. The modulation index may be a parameter that represents how many bits can be loaded per symbol and represents the number of bits allocated to frequency space resources (k, l) (bit-loading).

A transmission apparatus based on the present invention may first determine a space-frequency filter such that the reliability condition associated with modulation indexes already allocated to space-frequency resources is satisfied and such that data may be transmitted with minimum transmission power, and for example, can determine the space-frequency filter as [Equation 4]. Here, the transmission power P may correspond to the power allocation parameter Q described above.

$$\{V, G\}^* = \underset{\{V,G\}}{\mathrm{argmin}} tr(P) \text{ s.t. } SINR_{k,l} \geq \beta_{b_{k,l}} \qquad \text{[Equation 4]}$$

Whether or not the reliability condition associated with modulation indexes has been satisfied can be calculated by using the SINR. If the calculated SINR ($SINR_{k,l}$) is greater than the reliability condition ($\beta_{b_{k,l}}$) then it can be decided that the reliability condition is satisfied. Since the transmitted data may be determined according to the modulation index and noise can be determined according to the channel status of the user terminal, the SINR can be calculated as the target of comparison for the reliability condition. Here, since the SINR may also be determined according to the space-frequency filter, a transmission apparatus based on the present invention can calculate the SINR and transmission powers for a variety of space-frequency filters to determine the space-frequency filter that uses minimum power while satisfying the reliability condition.

As the SINR can be increased the more the transmission power is increased, the space-frequency filter that corresponds to the minimum transmission power satisfying the reliability condition can be determined as the solution to [Equation 4].

In describing FIG. 7, it has been mentioned that the space-frequency filter can be determined according to the channel status, and in certain embodiments, the transmission apparatus can determine the space-frequency filter that considers the channel status and at the same time minimizes transmission power.

Also, when the space-frequency filter for the space-frequency resources is given, a transmission apparatus based on the present invention may determine the modulation index for each space-frequency resource such that the data throughput condition ($b_i$) for each user terminal in the effective channel, which is determined according to the combination of the channel and the space-frequency filter, is satisfied while at the same time the transmission symbol can be transmitted with minimum power.

A transmission apparatus based on the present invention, in one example, can determine the modulation index for each space-frequency resource as in [Equation 5].

$$\{b_{k,l}\}^* = \underset{\{\beta_{k,l}\}}{\arg\min}\, tr(P) \text{ s.t. } \sum_{(k,l)\in R_i} b_{k,l} = b_i. \qquad [\text{Equation 5}]$$

A transmission apparatus based on the present invention can increment the modulation index from the initial value by 1 to decide whether or not the data throughput condition is satisfied for each user terminal. Since an increase in the modulation index yields an increase in the transmission rate, the possibility of the data throughput condition being satisfied can also increase.

Here, the transmission apparatus may determine the modulation index such that the data throughput condition in the effect channel associated with the determined space-frequency filter is satisfied, and at the same time, determine the modulation index such that the transmission symbol can be transmitted with minimum power.

Simply put, a transmission apparatus based on the present invention can determine the space-frequency filter and the modulation index that satisfy both [Equation 4] and [Equation 5] simultaneously.

In other words, a transmission apparatus based on the present invention can determine the frequency filter and spatial filter that minimize transmission power by using modulation indexes set beforehand for frequency and space resources and can update the modulation indexes that minimize transmission power by using the frequency filter and spatial filter determined as above. The updated modulated indexes can be used again in determining the space-frequency filter.

According to the present invention, since the frequency filter and the spatial filter are applied for each sample, the space-frequency filter and the modulation index can be determined differently for each sub-symbol, so that ultimately each sub-symbol can be transmitted with a different transmission power allocated.

The method of determining the space-frequency filters and modulation indexes described above may be expressed as the pseudo-code shown in FIG. 12.

The technology described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the embodiments or can be a type of medium known to and used by the skilled person in the field of computer software. A computer-readable medium may include a hardware device that is specially configured to store and execute program instructions. Some examples may include magnetic media such as hard disks, floppy disks, and magnetic tapes, optical media such as CD-ROM's and DVD's, magneto-optical media such as floptical disks, and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments, and vice versa.

While the present invention is described above by way of limited embodiments and drawings that refer to particular details such as specific elements, etc., these are provided only to aid the general understanding of the present invention. The present invention is not to be limited by the embodiments above, and the person having ordinary skill in the field of art to which the present invention pertains would be able to derive numerous modifications and variations from the descriptions and drawings above. Therefore, it should be appreciated that the spirit of the present invention is not limited to the embodiments described above. Rather, the concepts set forth in the appended scope of claims as well as their equivalents and variations are encompassed within the spirit of the present invention.

What is claimed is:

1. A method for enabling multiple access in a wireless communication system, the method comprising:
   allocating resources for a plurality of user terminals according to space and frequency;
   performing a discrete Fourier transform on a transmission symbol for each unit of the space, the transmission symbol composed of a plurality of sub-symbols and configured to be transmitted according to the allocated space and frequency resources; and
   applying a frequency filter and a spatial filter on a result of the discrete Fourier transform,
   wherein the applying of the frequency filter and the spatial filter comprises:
   selecting a pulse shaping filter according to an arranged position of the allocated frequency resource for each unit of the space and applying the selected pulse shaping filter on a sample representing a result of applying the discrete Fourier transform on a sub-symbol to a frequency domain.

2. The method for enabling multiple access in the wireless communication system according to claim 1, wherein the selected pulse shaping filter is from among a Square-Root Raised Cosine (SRRC) filter, a left-squeezed SRRC filter, a right-squeezed SRRC filter, and a rectangular filter.

3. The method for enabling multiple access in the wireless communication system according to claim 2, wherein the method further comprising:
performing pulse shaping filtering on the sample in an order of the left-squeezed SRRC filter and the right-squeezed SRRC filter, when allocation indexes of the frequency resources for a user terminal are consecutive.

4. The method for enabling multiple access in the wireless communication system according to claim 3, wherein the method further comprising:
performing pulse shaping filtering on the sample with at least one rectangular filter arranged between the left-squeezed SRRC filter and the right-squeezed SRRC filter, when a number of consecutive allocation indexes is three or more.

5. The method for enabling multiple access in the wireless communication system according to claim 2, wherein the method further comprising:
performing pulse shaping filtering on the sample by using the SRRC filter and the right-squeezed SRRC filter, when allocation indexes of the frequency resources for a user terminal are not consecutive.

6. The method for enabling multiple access in the wireless communication system according to claim 1, wherein the method further comprising:
applying a frequency-domain equalizer filter to the sample according to a channel status of a user terminal; and
applying the spatial filter to the sample according to a channel status of the user terminal.

7. The method for enabling multiple access in the wireless communication system according to claim 1, wherein the discrete Fourier transform is an M-point Fast Fourier Transform (FFT), where M corresponds to a number of the sub-symbols.

8. The method for enabling multiple access in the wireless communication system according to claim 1, wherein a modulation mode is determined for each of the sub-symbols, and a modulation index and the spatial filter are determined simultaneously such that power for the transmission symbol is minimized.

9. The method for enabling multiple access in the wireless communication system according to claim 8, wherein the sub-symbol is Quadrature Amplitude Modulation (QAM) data.

10. A method for enabling multiple access in a wireless communication system, the method comprising:
allocating resources for a plurality of user terminals according to space and frequency;
performing a discrete Fourier transform on a transmission symbol for each unit of the space, the transmission symbol composed of a plurality of sub-symbols and configured to be transmitted according to the allocated space and frequency resources; and
applying a frequency filter and a spatial filter on a sample representing a result of applying the discrete Fourier transform on a sub-symbol to a frequency domain,
wherein the frequency filter comprises a frequency-domain equalizer filter and a pulse shaping filter.

11. The method for enabling multiple access in the wireless communication system according to claim 10, wherein the applying of the frequency filter and the spatial filter comprises:
selecting the pulse shaping filter according to arranged positions of the allocated frequency resources for each unit of the space and applying the selected pulse shaping filter on the sample;
applying the frequency-domain equalizer filter to the sample according to a channel status of a user terminal; and
applying the spatial filter to the sample according to a channel status of the user terminal.

12. The method for enabling multiple access in the wireless communication system according to claim 10, further comprising:
determining the spatial filter which minimizes transmission power by using a modulation index preset for the frequency and space resources; and
updating the modulation index which minimizes the transmission power by using the spatial filter.

13. A transmission apparatus for enabling multiple access in a wireless communication system, the transmission apparatus comprising:
a resource allocation part configured to allocate resources for a plurality of user terminals according to space and frequency;
a Fourier transform part configured to perform a discrete Fourier transform on a transmission symbol for each unit of the space, the transmission symbol composed of a plurality of sub-symbols and configured to be transmitted according to the allocated space and frequency resources; and
a filtering part configured to select a pulse shaping filter according to an arranged position of the allocated frequency resource for each unit of the space and to apply the selected pulse shaping filter on a sample representing a result of applying the discrete Fourier transform on a sub-symbol to a frequency domain.

14. The transmission apparatus for enabling multiple access in the wireless communication system according to claim 13, wherein the filtering part comprises:
a frequency filtering part configured to perform filtering on the sample by using the pulse shaping filter and a frequency-domain equalizer filter; and
a spatial filtering part configured to perform filtering on the sample by using a spatial filter.

15. The transmission apparatus for enabling multiple access in the wireless communication system according to claim 13, wherein the filtering part selects the pulse shaping filter from among a Square-Root Raised Cosine (SRRC) filter, a left-squeezed SRRC filter, a right-squeezed SRRC filter, and a rectangular filter.

16. The transmission apparatus for enabling multiple access in the wireless communication system according to claim 15, wherein the filtering part performs pulse shaping filtering on the sample in an order of the left-squeezed SRRC filter and the right-squeezed SRRC filter when allocation indexes of the frequency resources for a user terminal are consecutive and performs pulse shaping filtering on the sample with at least one rectangular filter arranged between the left-squeezed SRRC filter and the right-squeezed SRRC filter when a number of consecutive allocation indexes is three or more.

* * * * *